(12) United States Patent
Hodge et al.

(10) Patent No.: US 8,577,910 B1
(45) Date of Patent: Nov. 5, 2013

(54) SELECTING RELEVANT LANGUAGES FOR QUERY TRANSLATION

(75) Inventors: Vanessa Hodge, San Francisco, CA (US); Kevin Law, San Francisco, CA (US); Radhika Malpani, Palo Alto, CA (US); Gaurav Garg, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 151 days.

(21) Appl. No.: 12/481,454

(22) Filed: Jun. 9, 2009

Related U.S. Application Data

(60) Provisional application No. 61/178,877, filed on May 15, 2009.

(51) Int. Cl.
*G06F 17/30* (2006.01)

(52) U.S. Cl.
USPC .......... 707/761; 707/600; 707/706; 707/713; 707/722; 707/758; 706/11; 706/14; 706/45; 715/200

(58) Field of Classification Search
None
See application file for complete search history.

(56) References Cited

U.S. PATENT DOCUMENTS

| | | | |
|---|---|---|---|
| 5,893,095 A | 4/1999 | Jain et al. | |
| 5,911,139 A | 6/1999 | Jain et al. | |
| 5,913,205 A | 6/1999 | Jain et al. | |
| 6,006,221 A | 12/1999 | Liddy et al. | |
| 6,078,916 A | 6/2000 | Culliss | |
| 6,381,598 B1 | 4/2002 | Williamowski et al. | |
| 6,526,400 B1 | 2/2003 | Takata et al. | |
| 6,594,654 B1 * | 7/2003 | Salam et al. | 1/1 |
| 6,604,101 B1 * | 8/2003 | Chan et al. | 707/706 |
| 6,640,218 B1 | 10/2003 | Golding et al. | |
| 6,701,309 B1 | 3/2004 | Beeferman et al. | |
| 6,757,646 B2 * | 6/2004 | Marchisio | 704/8 |
| 6,983,270 B2 | 1/2006 | Rippich | |
| 7,047,182 B2 * | 5/2006 | Masuichi | 704/7 |
| 7,130,849 B2 | 10/2006 | Yayoi et al. | |
| 7,146,358 B1 | 12/2006 | Gravano et al. | |
| 7,165,080 B2 | 1/2007 | Kotcheff et al. | |
| 7,260,570 B2 | 8/2007 | Brown et al. | |
| 7,421,097 B2 | 9/2008 | Hamza et al. | |
| 7,668,823 B2 | 2/2010 | Oldham et al. | |
| 7,672,831 B2 | 3/2010 | Todhunter et al. | |
| 7,698,331 B2 | 4/2010 | Carson et al. | |

(Continued)

OTHER PUBLICATIONS

Kimura et al, "Cross-Language Information Retrieval Based on Category Matching Between Language Versions of a Web Directory", Japan, 2003.*

(Continued)

*Primary Examiner* — Hung Le
(74) *Attorney, Agent, or Firm* — Fish & Richardson P.C.

(57) ABSTRACT

Methods, systems, and apparatus, including computer program products, for generating visual media search results are provided. A search query in a first language is received. A plurality of languages are identified. It is determined whether a language should be selected by translating the search query into translated terms in the language, determining a score for each translated term measuring how common the translated term is, and using the scores to determine if the language should be selected. A second language is selected from the plurality of different languages by selecting the considered language if it should be selected and otherwise selecting the second language according to a criterion. A set of one or more search results are generated based on the search query and a translation of the search query into the second language. The results are ordered based on a quality of results statistic for the translated query.

21 Claims, 7 Drawing Sheets

(56) References Cited

U.S. PATENT DOCUMENTS

| | | | |
|---|---|---|---|
| 7,720,856 B2* | 5/2010 | Goedecke et al. | 707/759 |
| 7,752,032 B2 | 7/2010 | Izuha | |
| 7,773,800 B2 | 8/2010 | Liu | |
| 7,783,633 B2 | 8/2010 | Florian et al. | |
| 7,813,917 B2 | 10/2010 | Shuster | |
| 7,818,314 B2 | 10/2010 | Chowdhury et al. | |
| 7,917,488 B2 | 3/2011 | Niu et al. | |
| 7,991,608 B2 | 8/2011 | Johnson et al. | |
| 8,024,337 B1 | 9/2011 | Baluja et al. | |
| 8,051,061 B2 | 11/2011 | Niu et al. | |
| 8,065,296 B1 | 11/2011 | Franz et al. | |
| 8,171,041 B2 | 5/2012 | Bennett | |
| 8,209,330 B1 | 6/2012 | Covell et al. | |
| 8,244,720 B2 | 8/2012 | Bihun et al. | |
| 8,364,462 B2 | 1/2013 | Joy et al. | |
| 8,457,416 B2 | 6/2013 | Liu et al. | |
| 2001/0021934 A1 | 9/2001 | Yokoi | |
| 2001/0029455 A1* | 10/2001 | Chin et al. | 704/277 |
| 2002/0097914 A1 | 7/2002 | Yaung | |
| 2002/0123982 A1* | 9/2002 | Masuichi | 707/1 |
| 2002/0156763 A1* | 10/2002 | Marchisio | 707/1 |
| 2002/0164075 A1 | 11/2002 | Acharya et al. | |
| 2002/0184206 A1 | 12/2002 | Evans | |
| 2003/0035595 A1 | 2/2003 | Liu | |
| 2003/0050923 A1 | 3/2003 | Chang et al. | |
| 2003/0200079 A1 | 10/2003 | Sakai | |
| 2004/0006560 A1* | 1/2004 | Chan et al. | 707/3 |
| 2004/0261021 A1 | 12/2004 | Mittal et al. | |
| 2005/0060311 A1 | 3/2005 | Tong et al. | |
| 2005/0234898 A1* | 10/2005 | Drissi et al. | 707/3 |
| 2005/0267734 A1 | 12/2005 | Masuyama | |
| 2006/0129915 A1* | 6/2006 | Chan | 715/512 |
| 2006/0173839 A1* | 8/2006 | Knepper et al. | 707/5 |
| 2006/0173886 A1* | 8/2006 | Moulinier et al. | 707/101 |
| 2006/0217954 A1 | 9/2006 | Koyama et al. | |
| 2006/0230022 A1* | 10/2006 | Bailey et al. | 707/3 |
| 2006/0230035 A1 | 10/2006 | Bailey et al. | |
| 2006/0241934 A1 | 10/2006 | Izuha | |
| 2006/0271350 A1 | 11/2006 | Chino et al. | |
| 2007/0106653 A1 | 5/2007 | Sun | |
| 2007/0250494 A1 | 10/2007 | Peoples et al. | |
| 2007/0276820 A1 | 11/2007 | Iqbal | |
| 2008/0015843 A1 | 1/2008 | Barghout | |
| 2008/0104045 A1 | 5/2008 | Cohen et al. | |
| 2008/0183685 A1 | 7/2008 | He et al. | |
| 2008/0189257 A1 | 8/2008 | Wiseman et al. | |
| 2008/0288474 A1* | 11/2008 | Chin et al. | 707/4 |
| 2008/0300854 A1 | 12/2008 | Eibye | |
| 2008/0306729 A1* | 12/2008 | Drissi et al. | 704/8 |
| 2008/0306923 A1* | 12/2008 | Drissi et al. | 707/3 |
| 2009/0024613 A1* | 1/2009 | Niu et al. | 707/5 |
| 2009/0063455 A1 | 3/2009 | Li et al. | |
| 2009/0070318 A1 | 3/2009 | Song et al. | |
| 2009/0074306 A1 | 3/2009 | Liu et al. | |
| 2009/0076800 A1 | 3/2009 | Li et al. | |
| 2009/0083243 A1* | 3/2009 | Heymans et al. | 707/4 |
| 2009/0089332 A1 | 4/2009 | Harger et al. | |
| 2009/0125497 A1* | 5/2009 | Jiang et al. | 707/4 |
| 2009/0132233 A1 | 5/2009 | Etzioni et al. | |
| 2009/0182547 A1* | 7/2009 | Niu et al. | 704/2 |
| 2009/0222437 A1 | 9/2009 | Niu et al. | |
| 2009/0326914 A1 | 12/2009 | Joy et al. | |
| 2010/0070662 A1* | 3/2010 | Odenwald et al. | 710/37 |
| 2010/0161642 A1* | 6/2010 | Chen et al. | 707/759 |
| 2010/0198837 A1 | 8/2010 | Wu et al. | |
| 2011/0055189 A1 | 3/2011 | Effrat et al. | |

OTHER PUBLICATIONS

Maeda et al, "Query Term Disambiguation for Web Cross-Language Information Retrieval using a Search Engine", ACM, 2000.*

Aljlayl, Mohammed et al., "On Arabic-English Cross-Language Information Retrieval: *A Machine Translation Approach*", Information Retrieval Laboratory [online] Illinois Institute of Technology [retrieved on Jun. 2, 2009]. Retrieved from: http://www.ir.iit.edu/publications/downloads/073_aljlayl_m.pdf.

Cross Language Information Retrieval, Moustafa A. Youssef, Apr. 2001 [online] Department of Computer Science, University of Maryland [retrieved on Jun. 2, 2009]. Retrieved from: http://www.otal.umd.edu/UUPractice/clir/.

Etzioni, Oren et al. "Lexical Translation with Application to Image Search on the Web", Turing Center [online], Dept. of Computer Science and Engineering, University of Washington [retrieved on Jun. 2, 2009]. Retrieved from: http://turing.cs.washington.edu/papers/EtzioniMTSummit07.pdf.

Google Search Appliance 6.0, "Access all of your business content through one search box". Datasheet [online], [retrieved on Jun. 2, 2009]. Retrieved from: http://www.google.com/url?sa=t&source=web&ct=res&cd=1&url=http%3A%2F%2Fwww.google.com%2Fenterprise%2Fpdf%2Fgsa_datasheet.pdf&ei=vH33SbriKKPFtgfA_eCiDw&usg=AFQjCNE_skaQmDwohxU9IIdeQ6DfkzdL1w.

Translated Search—Google Translate, [online], [retrieved on Jun. 2, 2009]. Retrieved from: http://translate.google.com/translate_s?hl=en.

History of Yandex, [online], [retrieved on Jun. 2, 2009]. Retrieved from: http://company.yandex.com/general_info/history.xml.

Example of image search, Yandex close up, ЯНДЕКС [online], [retrieved on May 5, 2009] Retrieved from: http://images.yandex.ru.

Example of image search, Yandex search results, ЯНДЕКС [online], [retrieved on May 5, 2009] Retrieved from: http://images.yandex.ru.

PanImages Image Search Tool Speaks Hundreds of Languages~Tech News Watch, Lockergnome, Sep. 12, 2007, [online], [retrieved on Jun. 2, 2009]. Retrieved from: http://www.lockergnome.com/news/2007/09/12/panimages-image-search-tool-speaks-hundreds-of-languages/.

Gao, W., et al. "Cross-Lingual Query Suggestion Using Query Logs of Different Languages", The Chinese University of Hong Kong, ACM, 2007.

Hu, R. et al. "Mining Translation of Web Queries from Web Clickthrough Data", Department of Computer Science, Huazhong University of Science and Technology, China, 2008.

Access all of your business content through one search box. Datasheet [online] Google Search Appliance 6.0 [retrieved on Jun. 2, 2009]. Retrieved from: 2Fgsa_datasheet.pdf&ei=vH33SbriKKPFtgfA_eCiDw&usg=AFQjCNE_skaQmDwohxU9IIdeQ6DfkzdLlw.

Youssef, Moustafa A., 'Cross Language Information Retrieval', Apr. 2001 [online] Department of Computer Science, University of Maryland [retrieved on Jun. 2, 2009]. Retrieved from: http://www.otal.umd.edu/UUPractice/clir/.

Chen, "Multilingual Information Retrieval Using English and Chinese Queries", University of California at Berkeley, 2002.

Chen, et al, "Multilingual Information Retrieval Using Machine Translation, Relevance Feedback and Decompounding", Kluwer Academic Publishers, Netherlands, 2004.

Oard, Douglas W., "Interactive Cross-Language Information Retrieval", 2001.

Gey, et al, "Cross Language Information Retrieval: A Research Roadmap", SIGIR, 2002.

Gey, et al, "New Directions in Multilingual Information Access", SIGIR, 2006.

He, et al, "Studying the Use of Interactive Multilingual Information Retrieval", ACM, 2006.

Kumaran, et al, "On Pushing Multilingual Query Operators into Relational Engines", Database Systems Laboratory, India, 2006.

Lu, et al, "Analysis of the Bilingual Queries of a Chinese Web Search Engine", Hong Kong, 2006.

Parton, et al, "Simultaneous Multilingual Search for Translingual Information Retrieval", ACM, 2008.

Clough, et al, "User Experiments With the Eurovision Cross-Language Image Retrieval System", Sheffield University, 2006.

Clough, et al, "The CLEF 2005 Cross-Language Image Retrieval Track", Sheffield University, UK, 2005.

Ambati, et al, "Using Monolingual Clickthrough Data to Build Cross-lingual Search System", ACM, 2006.

(56) References Cited

OTHER PUBLICATIONS

Sanderson, et al, "Measuring a cross language image retrieval system", Sheffield University, UK, 2004.
Jones, Gareth, "New Challenges for Cross-Language Information Retrieval: multimedia data and user experience", Cross-Language Evaluation Forum Workshop, Portugal, 2000.
Office Action issued in U.S. Appl. No. 12/481,421 on May 23, 2011, 15 pages.
Office Action issued in U.S. Appl. No. 12/481,448 on May 24, 2011, 14 pages.
Office Action issued in U.S. Appl. No. 12/477,577 on Sep. 1, 2011, 17 pages.
Notice of Allowance Action issued in U.S. Appl. No. 12/481,448 on Jan. 3, 2012, 11 pages.
Notice of Allowance issued in U.S. Appl. No. 12/481,421 on Jan. 9, 2012, 10 pages.
Notice of Allowance issued in U.S. Appl. No. 12/481,448 on Feb. 15, 2012, 10 pages.
Office Action issued in U.S. Appl. No. 12/477,577 on Mar. 13, 2012, 15 pages.
Notice of Allowance issued in U.S. Appl. No. 12/481,421 on Apr. 2, 2012, 10 pages.
Office Action issued in U.S. Appl. No. 12/481,448 on Apr. 25, 2012, 13 pages.
Office Action issued in U.S. Appl. No. 12/481,421 on Jul. 11, 2012, 11 pages.
Office Action issued in U.S. Appl. No. 12/481,421 on Oct. 29, 2012, 18 pages.
Office Action issued in U.S. Appl. No. 12/481,448 on Oct. 29, 2012, 17 pages.
Office Action issued in U.S. Appl. No. 12/477,577 on Mar. 7, 2013, 22 pages.
Notice of Allowance issued in U.S. Appl. No. 12/481,421 on Apr. 24, 2013, 15 pages.
Notice of Allowance issued in U.S. Appl. No. 12/481,448 on May 3, 2013, 12 pages.
Notice of Allowance issued in U.S. Appl. No. 12/477,577 on Jun. 24, 2013, 33 pages.

\* cited by examiner

SELECTING RELEVANT LANGUAGES FOR QUERY TRANSLATION

This application claims priority to U.S. Provisional Application Ser. No. 61/178,877, filed May 15, 2009, the entire disclosure of which is incorporated herein by reference.

BACKGROUND

This invention relates to increasing the number of visual media search results generated in response to a visual media search query in one language by additionally searching in another relevant language.

FIG. 1A illustrates an example conventional approach—an example user interface for a search engine where a user has entered a visual media search query in one language (Greek) and the search engine has generated associated results in that language. In general, a search engine is a program that receives a search query from a user and returns one or more search results that satisfy the search query. In general, a visual media search is a word-based search for visual media. The visual media search query is the word or words on which the search is based. Visual media includes, for example, images, video, images embedded in files, video embedded in files, and interactive media such as javascript or actionscript games.

In FIG. 1A, the visual media search query is "σκιερ" 102. σκιερ is the Greek word for skier. In response to receipt of the visual media search query, a search is performed, one matching result 104 is identified, and this one matching result 104 is presented to the user through the user interface.

SUMMARY

In general, one aspect of the subject matter described in this specification can be embodied in methods that include the following. A first visual media search query is received. The visual media search query is in a first language. A plurality of different languages are identified. Each language is associated with a corpus of documents. It is determined whether a current language in the plurality of different languages should be selected. The determining includes translating the first visual media search query into one or more translated terms in the current language, determining a score for each translated term, and using the scores to determine if the language should be selected. Each score measures how common the translated term is in the corpus associated with the current language. A second language is selected from the plurality of different languages. The current language is selected if it was determined that the current language should be selected. Otherwise, the second language is selected according to a first criterion. A final group of visual media search results are generated. The final group of visual media search results are generated based on the first visual media search query and a second query, where the second query is a translation of the first visual media search query into the second language. The one or more visual media search results are ordered based in part on a quality of results statistic for the second query. Other implementations of this invention include corresponding systems, apparatus, computer program products, and computer readable media.

These and other implementations can optionally include one or more of the following features. Selecting the second language according to the first criterion can include repeating the determining step for each language in the plurality of different languages, until it is determined that a language from the plurality of different languages should be selected or all of the plurality of different languages have been considered. A language can be selected if it was determined that the language should be selected. Otherwise, the second language can be selected according to a second criterion. The plurality of different languages can have an order, and each language can be considered in accordance with that order. The order can be the descending size of the corpus associated with each language.

The final group of visual media search results can be presented.

The score can be the inverse document frequency of the translated term in the current corpus. Using the scores to determine if the current language should be selected can include deciding the current language should be selected if a highest inverse document frequency of the inverse document frequencies of the one or more translated terms is in an acceptable range.

Generating the final group of visual media search results based on the first visual media search query and a second query, where the second query is a translation of the first visual media search query into the second language, and where the one or more visual media search results are ordered based in part on a quality of results statistic for the second query can include the following. A click through rate corresponding to the second query is obtained. A final visual media search query is created using the first visual media search query, the second query, and the quality of results statistic. A final group of search results responsive to the final visual media search query is generated. Visual media search results in the final group that are responsive to the second visual media search query are assigned a ranking based in part on the click through rate. Generating the group of one or more visual media search results can also include the following. A click through rate corresponding to the second query is obtained. The second query is associated with one of a plurality of confidence bins based on the click through rate. A final visual media search query is created using the first visual media search query, the second query, and the confidence bin associated with the second query. A final group of visual media search results responsive to the final visual media search query is generated, where visual media search results in the final group are assigned a ranking based in part on the confidence bin associated with the second query.

It can be determined that an additional language in the plurality of different languages should be selected. This determination can include translating the first visual media search query into one or more translated terms in the additional language, determining a score for each translated term, where the score measures how common the translated term is in a corpus associated with the additional language, and using the scores for the one or more translated terms to determine if the additional language should be selected. A third language can be selected from the plurality of different languages. The selection can include selecting the additional language if it was determined that the additional language should be selected, and otherwise selecting the third language according to a third criterion. Generating the final group of visual media search results can be further based on a third query. The third query can be a translation of the first visual media search query into the third language. The one or more search results can be further ordered based in part on a quality of results statistic for the third query.

Selecting the third language according to the third criteria can include repeating the determining step for each language in the plurality of different languages, until it is determined that a language from the plurality of different languages should be selected or all of the plurality of different languages have been considered. A language is selected it was determined that the language should be selected. Otherwise, the third language is selected according to a third criterion.

Visual media can be an image, a video, an image embedded in a file, or a video embedded in a file.

Particular embodiments of the subject matter described in this specification can be implemented to realize one or more of the following advantages. A larger group of relevant visual media search results can be provided in response to a visual media search query. A group of visual media search results that are more responsive to a given visual media search query can be provided in response to the visual media search query. Search results relevant to a local concept can be returned even if the user searches in a language different from the local language.

The details of one or more implementations of the invention are set forth in the accompanying drawings and the description below. Other features, objects, and advantages of the invention will be apparent from the description and drawings, and from the claims.

DETAILED DESCRIPTION

Figure 1A:
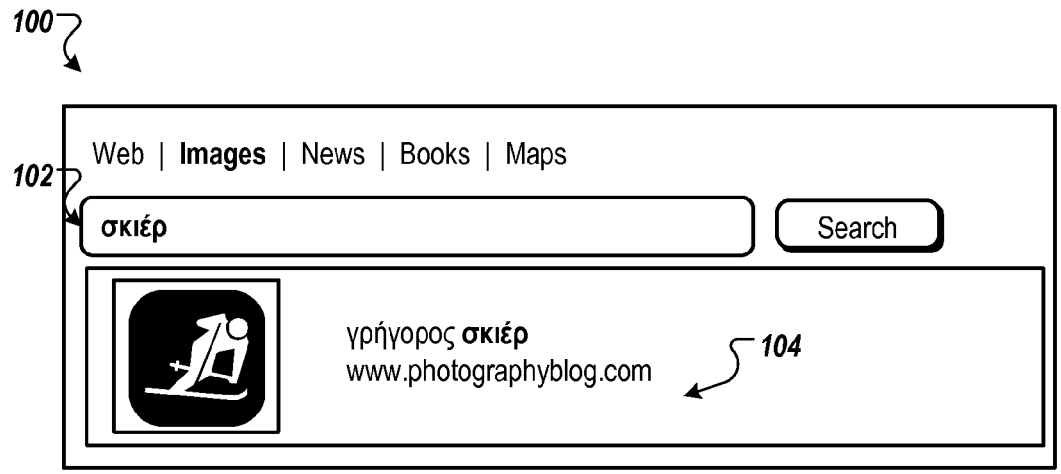
FIG. 1A illustrates an example conventional approach featuring an image search query in one language and associated results in that language.

The small group of search results shown in FIG. 1A can be disappointing to a user. There are many reasons a group of search results can be small, including an unusual topic or a misspelled search query. However, in many cases, the group of search results is small because of the language the user is searching in. Some concepts are more popular in certain languages. For example when discussing the Golden Gate Bridge in San Francisco, Calif., people are more likely to use English than Dutch, because the Golden Gate Bridge is a United States' landmark, and the English phrase is how the bridge is named in the United States. If a user has entered a search query in a natural language where the search query is not a popular concept, few results may be returned. This is true even though the search query concept may be very popular in other natural languages and, if the user entered a visual media search query in one of those other languages, he or she would be presented with a larger number of search results.

Figure 1B:
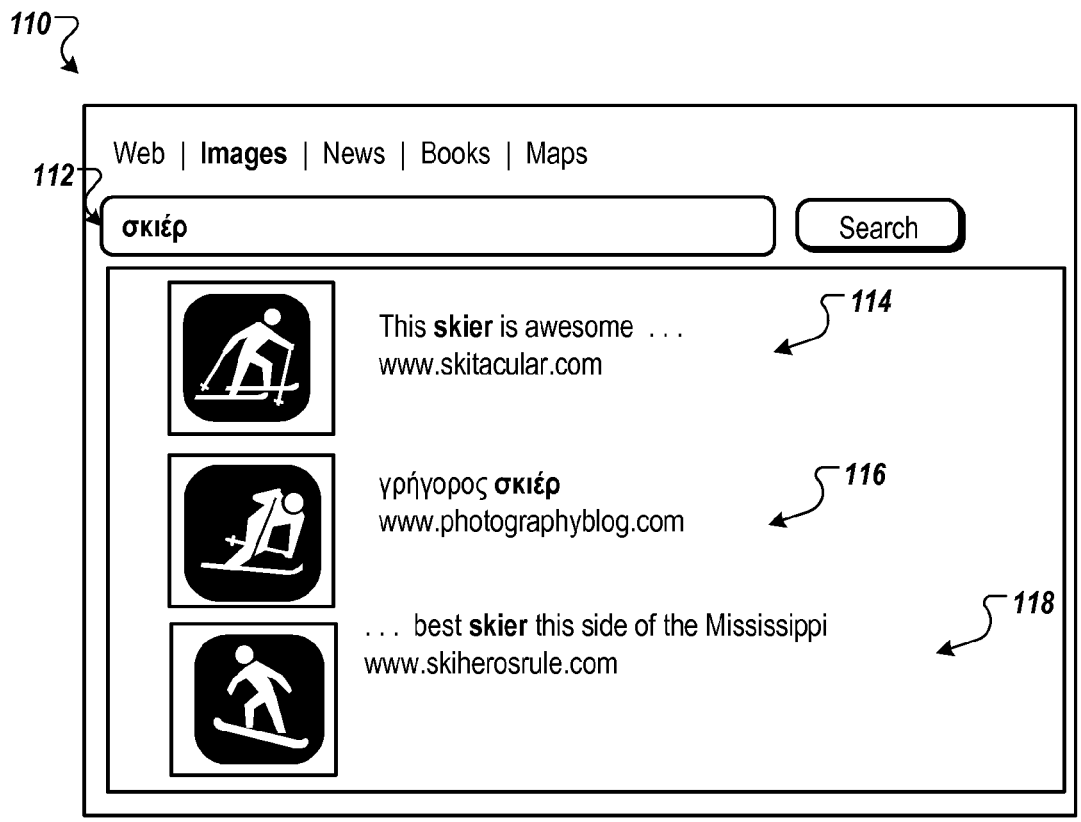
FIG. 1B illustrates an example image search query in one language and associated results in that language and a second language.

FIG. 1B illustrates an example user interface for a search engine where a user has entered a visual media search query in one natural language (Greek) and the search engine has generated associated results in two different natural languages (Greek and English). English is selected as a second search language from a plurality of possible languages based on how common the term "skier" is in English. In general, a language should be selected if the query terms are common, but not too common, in the language. If query terms are too common, then irrelevant results may be introduced. However, if the query terms are too rare, then the quality of the results may be poor.

One way of measuring how common a query term or phrase is in a language is by calculating the inverse document frequency of the query term or phrase. The inverse document frequency is calculated by taking the total number of documents in a corpus dividing that by the number of documents in the corpus that contain the term or phrase in question, and then taking the logarithm of the quotient. In general, a corpus is a collection of documents, visual media, and other information indexed by a search engine.

In FIG. 1B, the user has entered the visual media search query "σκιέρ" 112, meaning skier in Greek. English is selected as a second language for the search based on how common the word "skier" is. A search is performed using both "σκιέρ" and "skier". The result is a more robust group of search results. The result from FIG. 1A 116 is again presented, but two additional results in English 114 and 118 are also presented.

Thus, if a visual media search query is augmented with its translation into a different relevant language, the user can be provided with additional search results. Two languages can be different when they are distinct languages, for example, English and French, or when they are different dialects of the same language. One way of identifying a different relevant language is by considering how common the terms of the query are in a given different language. Because visual media typically involves image and video content which conveys information independent of language, the user is likely less concerned with the language of the search result and more concerned with the content of the visual media. Therefore, visual media search queries are an especially fruitful area for query translation. However, similar techniques could be used in any other type of search, for example, documents searches.

Visual media is not limited to images. For example, visual media can include video, images embedded in an electronic file, video embedded in an electronic file, and interactive media such as javascript or actionscript games. Visual media does not necessarily correspond to an electronic file. Visual media can be stored in a portion of a file that holds other documents, in a single file dedicated to the visual media in question, or in multiple coordinated files. Moreover, visual media can be stored in memory without first having been stored in a file.

The search query does not have to be received from a user; instead, it can be received from any source, including, for example, a computer or a process on a computer. The search query does not have to be received through a search engine user interface, but can be received through any interface where a user or a process is able to send a search query.

Presenting search results is not limited to causing visual media to be presented to the user. Presenting search results can include, for example, displaying search results on a display device, transmitting search results to a user's computer for presentation to the user, transmitting search results to another device, transmitting sounds corresponding to the search results, providing haptic feedback corresponding to the search results, or transmitting signals comprising haptic feedback corresponding to the search results to a user's computer for presentation to the user. Other methods of presenting search results are possible.

Figure 2:
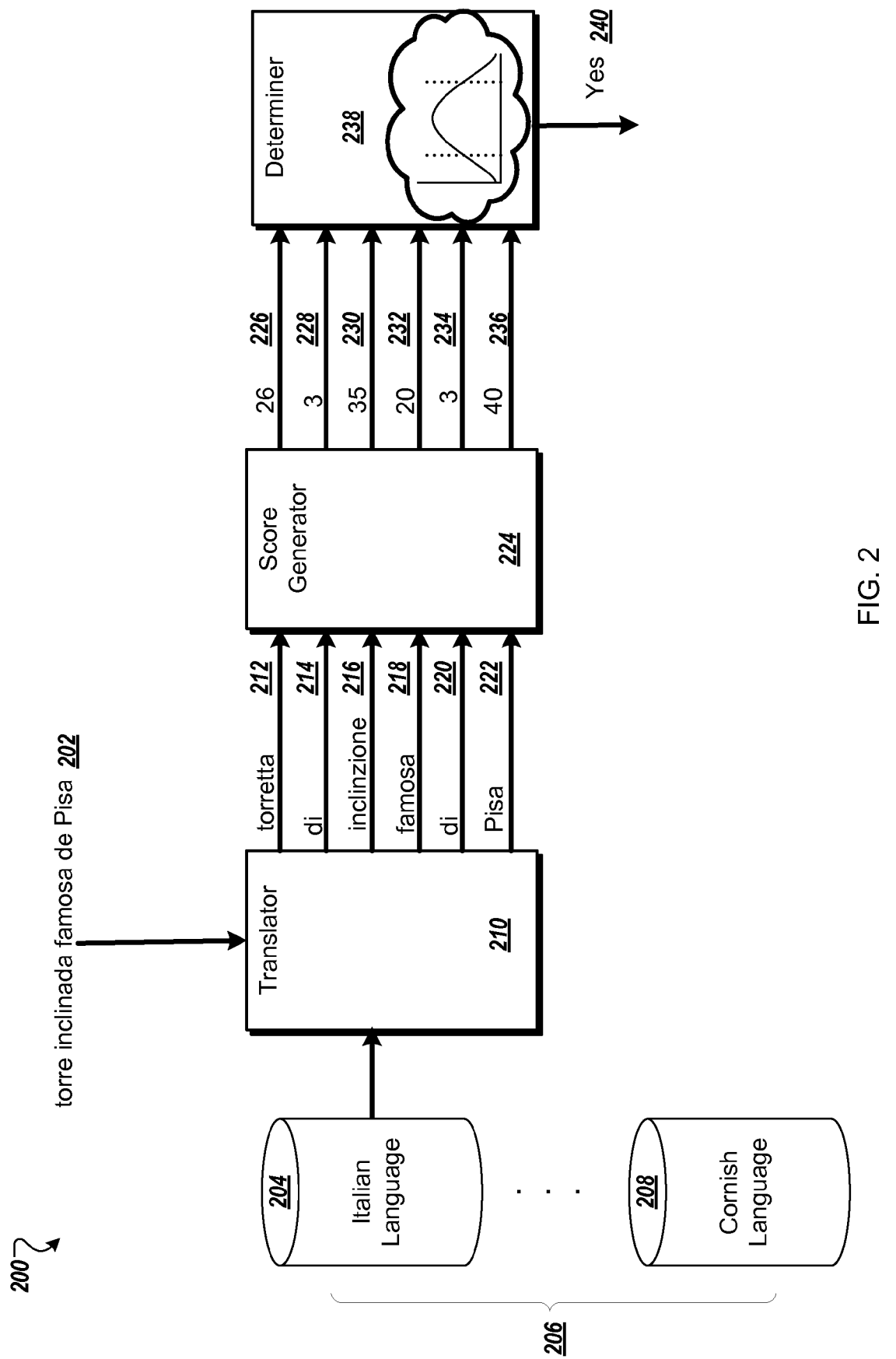
FIG. 2 illustrates an example of determining if a language should be selected.

FIG. 2 illustrates an example of determining if a language should be selected for translation. A visual media search query 202 and a potential language 204, here, Italian, are received by a translator 210. In some implementations, the potential language 204 is chosen from a plurality of languages 206. The plurality of languages can be any group of languages, for example, all languages whose corresponding corpora have been indexed, or languages with a large number of visual media search results.

In various implementations, the translator 210 translates the visual media search query 202 into one or more terms in the specified language 204. The translator translates the search query into the specified language using various translation techniques. For example, the translator can look up the translation in a translation dictionary.

In FIG. 2, the visual media search query "tone inclinada famosa de Pisa" 202 (Portuguese for "famous leaning tower of Pisa") is translated into the Italian language 204. The translation contains a number of terms 212-222. While, as shown in FIG. 2, a term generally corresponds to a single word in the query, a term can include multiple words, for example, a phrase in the translation or even the entire translation. The number of terms in the translated query can be, but does not have to be, equal to the number of terms in the visual media search query.

In various implementations, each term 212-222 is passed to a score generator 224. The score generator determines a score 226-236 for each term. For example, the term toretta 212 is assigned a score 226 of 26. In general, the score measures how common the translated term is in the selected language. Possible scores for terms range along a spectrum. At one end of the spectrum are scores that indicate a term is too common in a language, for example "the" in English or a common first name such as "Nancy." Terms that are too common may result in irrelevant search results being identified, because they will match results with little relevance to the overall query. For example, if "the wombat" is a translation of a user's query, the user likely does not want searches corresponding to "the slice of chocolate cake" just because both phrases include the word "the." At the other end of the spectrum are terms that are too rare, for example, terms describing a concept that is not often described in the translated language or an unusual way of describing a concept in the translated language. Terms that are too rare will results in too few search results being identified. For example, if a user searched for "Combate ditto Lumecon," the Portuguese translation of the phrase "Combat dit Lumecon" used to describe the reenactment of the battle between St. George and the Dragon held every year in Mons, Belgium, few results will be returned because the Belgian reenactment, though commonly described in French, is not commonly described in Portuguese.

In some implementations, the score of a term is the inverse document frequency of the term. However, alternative scores are possible, for example, a score based on the number of queries using the term that were submitted by users. In some implementations, determining a score includes calculating a score for the term in real-time when the score is requested. In some implementations, determining a score includes referencing a pre-determined score, for example, looking up a score for the term in a relational database that associates a given term with its score.

While scores for individual terms are illustrated in FIG. 2, in some implementations scores are calculated for combinations of terms, for example, phrases in the translated search query or the entire translated search query. In some implementations, these term combination scores are calculated instead of scores for individual terms. In some implementations, these term combination scores are calculated in addition to scores for individual terms.

In various implementations, the one or more scores are passed to a determiner 238 that uses the scores to decide whether or not a language should be selected. The determiner 238 examines one or more of the scores and determines whether they are in an acceptable range. An acceptable range is one that includes scores corresponding to terms that are neither too common nor too rare in the translated language. An acceptable range can be determined by manually tweaking a threshold until an acceptable range is identified. For example, one or more thresholds can be tested, the results of using each threshold can be compared, and the threshold that gave the best performance can be selected. Performance can be measured in a number of ways, for example, estimating the relevance of the visual media results by asking one or more users or analyzing the visual media search results. Other ways to determine an acceptable range are possible. In some implementations, the determiner examines the highest score of the one or more scores and selects the language if the score is in an acceptable range. In some implementations, the determiner examines the lowest score of the one or more scores and selects the language if the score is in an acceptable range. In some implementations, the determiner examines a subset of the scores and selects the language if one or more of the scores in the subset are in an acceptable range, for example, if all of the scores in the subset are in an acceptable range, or if two-thirds of the scores in the subset are in an acceptable range. In some implementations, the determiner examines all of the scores and selects the language if any of the scores is in an acceptable range. In some implementations, the determiner examines all of the scores and selects the language if each score is in an acceptable range. Other methods of using the scores to determine if a language should be selected are possible.

In some implementations, when the determiner decides that a language should not be selected, the determination process continues with another language from the plurality of languages. In some implementations, the plurality of languages 206 has an order, and the languages are considered in that order. In some implementations, the order is based on the size of the corpus associated with each language. For example, in these implementations, the Italian language 204 is considered before the Cornish language 208 because more documents, visual media, and other information is available in Italian than in Cornish.

In some implementations, the determination is made as needed. In some implementations, the determination of whether a particular query should be translated into a particular language is done in advance and stored, for example, in a database that associates a given query and a given language with whether the query should be translated into that language.

Figure 3:
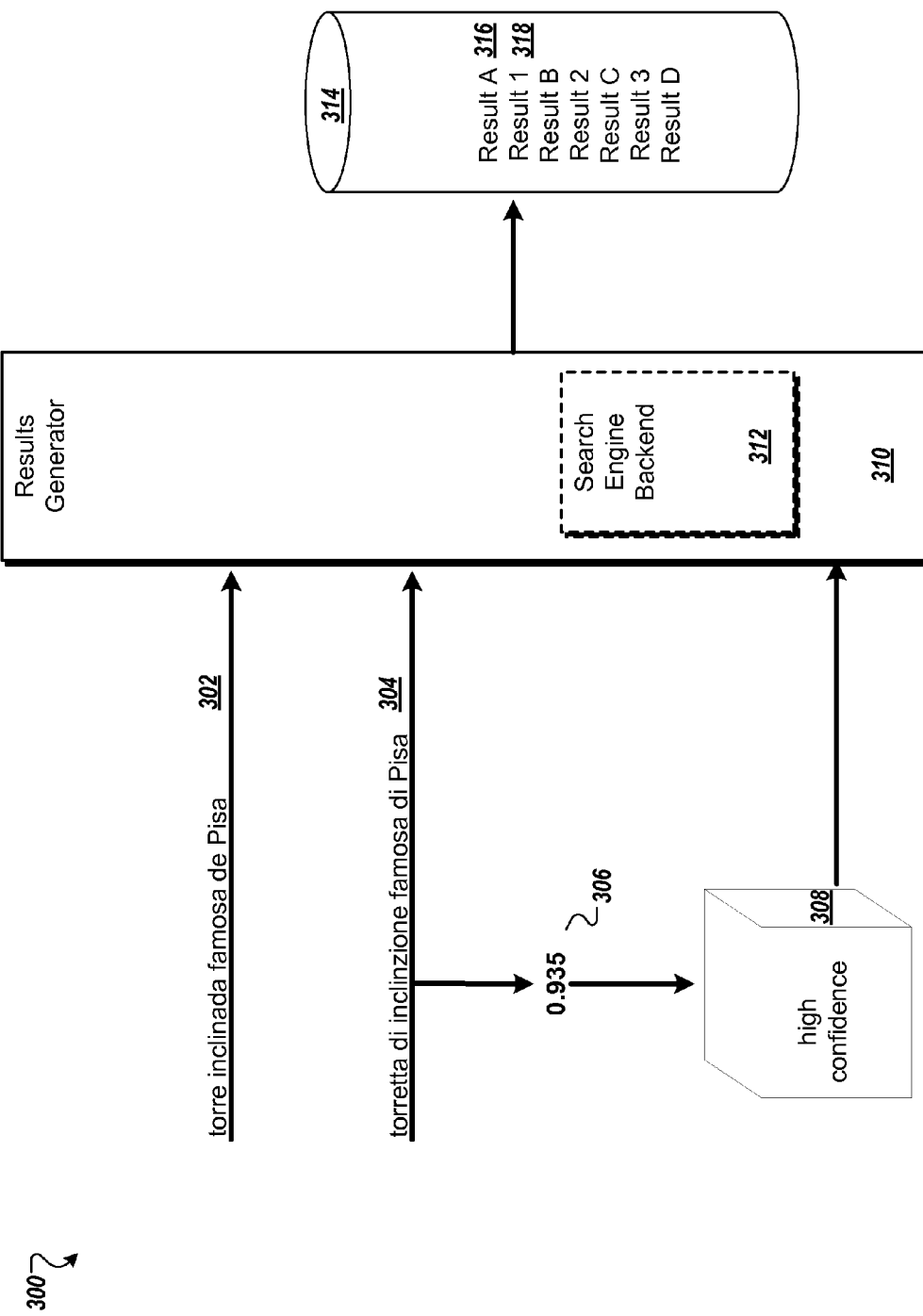
FIG. 3 illustrates an example of using a query, a translation of the query, and an quality of results statistic for the translation of the query to generate a group of search results.

FIG. 3 illustrates an example of using a query, a translation of the query, and an quality of results statistic for the translated query to generate a group of search results. In various implementations, a visual media search query 302, a translation of the visual media search query into a different language 304, and information 308 corresponding to an quality of results statistic for the translated query are passed to a results generator 310 which generates a group of search results 312.

In various implementations, the quality of results statistic for the translated query is an estimate of how useful a user will find results responsive to the translated query. In some implementations, the quality of results statistic for the translated query is a click through rate corresponding to the translated query. A click through rate is a measure of how frequently users select one or more search results after submitting a query. The click through rate is calculated by taking the number of times users selected a search result after submitting a query sufficiently similar to the translated query and dividing that by the total number of times the query was submitted by the population of users. In some implementations, the query must be identical to the translated query. In alternative implementations, the submitted query and the translated query can be sufficiently similar when they are not identical. For example, the query and the translated query can still be sufficiently similar despite small differences in spelling, small differences in word order, the use of abbreviations, the use of synonyms, or the use of stop words (e.g., known terms that do not contribute to the topicality of the query such as "a" or "the"). Other common measures of similarity can also be used, for example, using the edit distance for the two queries. Other quality of results statistics are possible, for example, the total number of results selected by users after issuing a query sufficiently similar to the translated query.

In further implementations, the quality of results statistic is determined based on the dwell time associated with one or more of the search results responsive to the query in the search history. Dwell time is the amount of time a user spends viewing a search result. Dwell time can be a continuous number, such as the number of seconds a user spends viewing a search result, or it can be a discrete interval, for example "short clicks" corresponding to clicks of less than thirty seconds, "medium clicks" corresponding to clicks of more than thirty seconds but less than one minute, and "long clicks" corresponding to clicks of more than one minute. In some implementations, a longer dwell time of one or more results is associated with a higher quality of results statistics. The quality of results statistic is higher, for example, because users found the results with a longer dwell time useful enough to view for a longer period of time.

In some implementations, the quality of results statistic is based on the popularity of the query, where the popularity of the query is the percentage of queries submitted by users that are sufficiently similar to the query. A query with a high popularity can be assigned a higher quality of results statistic for various reasons. For example, a high popularity indicates that the query is commonly used, and thus likely a common way of describing a concept in the language of the query.

Other quality of results statistics for the translated query are possible, for example, estimating how common a concept described by the query is in the translated language.

In various implementations, the quality of results statistic for the translated query is provided directly to the results generator. In some implementations, the quality of results statistic for the translated query is used to determine additional information corresponding to the quality of results statistic for the translated query. In these implementations, the additional information is provided to the results generator 310 and used by the results generator 310 instead of or in addition to the actual quality of results statistic. In some implementations, the additional information is the output of a function that takes the quality of results statistic as an input and returns a confidence value. In some implementations, the function is continuous. In some implementations, the function is discrete. In some implementations, the additional information is a confidence bin. For example, four bins can be identified, one corresponding to quality of results statistics between 0 and 0.25 ("very low confidence"), one corresponding to quality of results statistics between 0.25 and 0.5 ("low confidence"), one corresponding to quality of results statistics between 0.5 and 0.75 ("medium confidence"), and one corresponding to quality of results statistics between 0.75 and 1 ("high confidence"). The quality of results statistic for the translated query is scaled from 0 to 1, by, for example, dividing by the highest possible quality of results statistic. The scaled quality of results statistic is then associated with its corresponding bin. The bin information is then provided to the results generator 310. Alternative ways of using confidence bins are possible. For example, any number of confidence bins can be used. The bins can be based on any range of scores, not just scores from 0 to 1. Alternative techniques of scaling the quality of results statistic for the translation are possible, for example, using a logarithmic scale. The quality of results statistic for the translated query does not have to be scaled. Alternative types of information corresponding to the quality of results statistic are possible.

In FIG. 3, the translated query "torretta di inclinzione famosa di Pisa" 304 has an associated quality of results statistic 306 of 0.935. A "high confidence" bin 308 is determined based on the quality of results statistic for the translated query. This bin information 308 is provided to the results generator 310 along with the translated query 304 and the original visual media search query 302.

In various implementations, the results generator 310 applies the visual media search query 302 and its translation 304 to one or more corpora of documents, resulting in a group of search results 314. The group of search results may include search results in the language of the visual media search query, e.g. Result A 316, and may also include search results in the language of the translation, e.g. Result 1 318. For example, in FIG. 3, Results A, B, C, and D correspond to results with Portuguese phrases (responsive to "torre inclinada famosa de Pisa" 302) and Results 1, 2, and 3 correspond to results with Italian phrases (responsive to "toretta di inclinzione famosa di Pisa" 304). Results can include phrases in more than one language. In some implementations, a result with a phrase satisfying the search query or its translation is included in the group of search results even if the rest of the document is in a different language.

The search results can be generated in a number of ways. In various implementations, the results generator 310 combines the query and its translation into one query that searches for both queries taking into account the quality of results statistic for the translated query. The combined query is then passed to a search engine backend 312 that generates the group of search results 314. The search engine backend ranks the search results 314 based in part on the quality of results statistic for the translated query. The resulting group of search results are selected or ranked by the search engine backend 310 based in part on the quality of results statistic for the translated query. An example of this technique is discussed in more detail in U.S. patent application Ser. No. 12/481,421, "Query Translation Quality Confidence,", which is incorporated herein by reference. In some implementations, the results generator 310 uses the search engine backend 312 to run two searches, one corresponding to the query and one corresponding to its translation. The results generator then combines the resulting groups of results in an order based at least in part on the quality of results statistic for the translated query. In some implementations, combining groups of results using the quality of results statistic for the translated query includes weighting each result in the two groups of results based on the quality of results statistic for the translated query and ordering the results based on the weight associated with the result. In some implementations, each result in the two groups of results has a corresponding score indicating its relevance to its corresponding query. In these implementations, the quality of results statistic for the translated query can be used to adjust the scores, for example, by increasing or decreasing certain scores, to reflect the quality of results statistic for the translated query. For example, in some implementations if the quality of results statistic for the translated query is low, the scores of the search results responsive to the translated query are reduced. Once the scores are adjusted, the combined group of results is generated by combining the results from the two groups of results in an order based on their adjusted scores. In some implementations, additional standards for combining the groups of results may also be used, for example, trying to include an equal number of results from the two groups of results in a given subset of the combined query results.

Other methods of generating a group of results responsive to a query and its translation taking into account a quality of results statistic of the translated query are possible.

Figure 4:
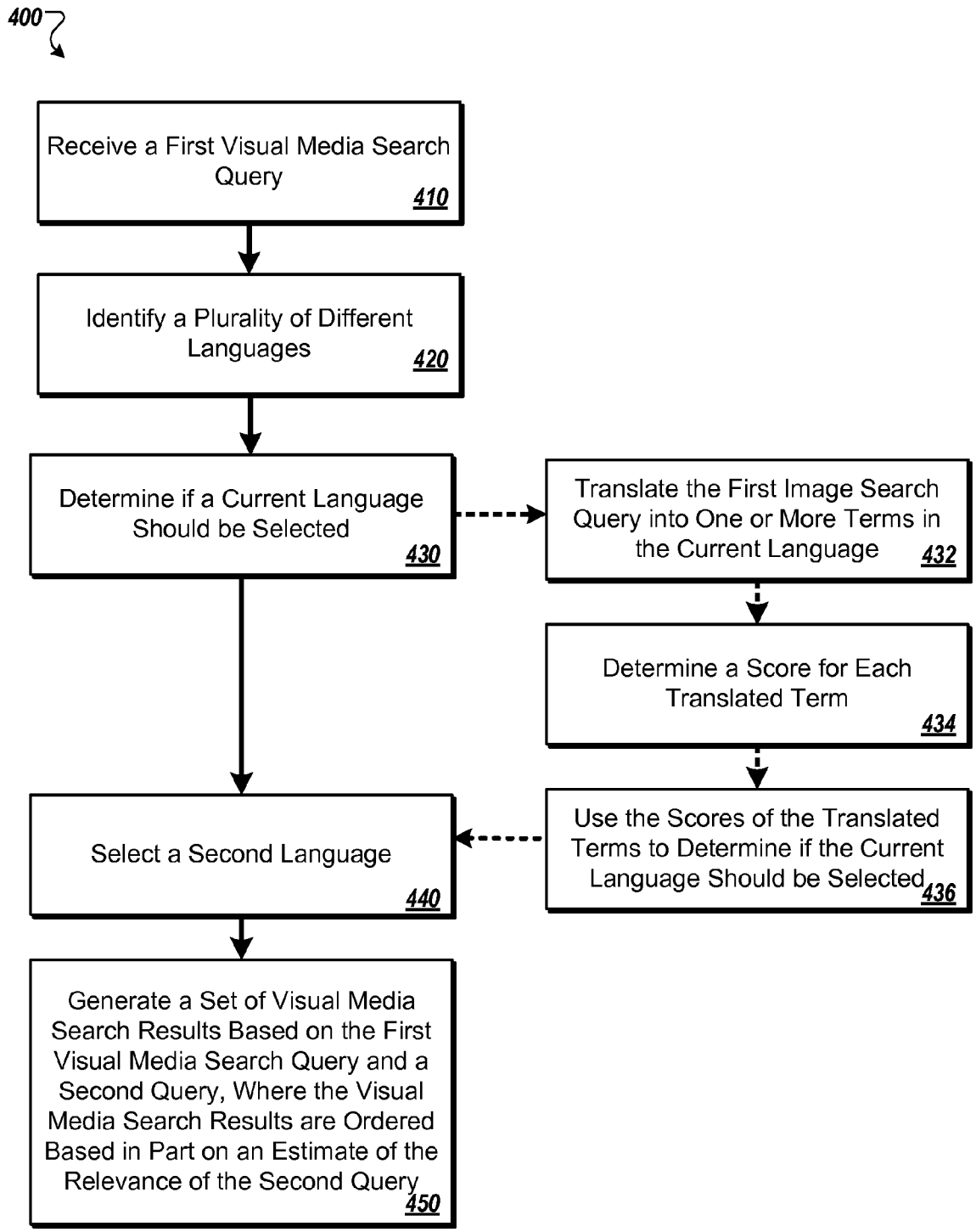
FIG. 4 illustrates an example technique for performing a visual media search based on a query and a translation of the query into a selected language.

FIG. 4 illustrates an example technique 400 for performing a visual media search based on a query and a translation of the query into a selected language. This technique can be performed by, for example, a search engine provider using one or more computers.

In step 410, a visual media search query is received (e.g., by a search engine provider). A visual media search query is a word or words defining a search for visual media. Various methods of receiving a search query are possible. For example, in various implementations, the visual media search query is received from a user's computer through a web interface. The web interface can be, for example, a web page, run by a search engine provider, that receives search queries from a user and presents results and other information relevant to the search query to the user. In alternative implementations, the visual media search query is received from a process running on a computer of the search engine or a computer of a third party.

In step 420, a plurality of different languages are identified (e.g., by the search engine provider).

In step 430, a determination is made as to whether a current language should be selected (e.g., by a search engine provider). The current language is a language being considered as a candidate language into which to translate the visual media search query. An example technique of such a determination is illustrated in FIG. 2. The determination can include multiple steps.

In step 432, the first image search query is translated into one or more terms in the current language (e.g., by a search engine provider). The translation can be done using various translation techniques, for example, looking up the translation in a translation dictionary. In some implementations, each term in the translation corresponds to a single word in the translation. In some implementations, a term corresponds to multiple words in the translation, for example, a phrase in the translation or even the entire translation.

In step 434, a score is determined for each translated term (e.g., by a search engine provider). In some implementations, the score of a term is the inverse document frequency of the term. However, other types of scores are possible, for example, a score based on the number of queries using the term that were submitted by users in a given time period. In some implementations, the score is calculated as needed. In some implementations, scores are pre-determined and referenced when needed.

In some implementations, a separate score is determined for each translated term. In some implementations, one score is calculated corresponding to multiple terms, for example, phrases in the translated search query or the entire translated search query.

In step 436, the scores corresponding to the translated terms are used to determine if the current language should be selected. In various implementations, this includes determining whether one or more of the scores is in an acceptable range.

In some implementations, it is determined that a language should be selected if the score corresponding to the rarest term in the translated terms is in an acceptable range. In some implementations, it is determined that a language should be selected if the highest score of the one or more scores is in an acceptable range. In some implementations, it is determined that a language should be selected if the lowest score of the one or more scores is in an acceptable range. In some implementations, it is determined that a language should be selected if one or more of scores in a subset of the scores are in an acceptable range, for example, if all of the scores in the subset are in an acceptable range, or if two-thirds of the scores in the subset are in an acceptable range. In some implementations, it is determined that a language should be selected if any of the scores is in an acceptable range. In some implementations, it is determined that a language should be selected if each score is in an acceptable range. Other techniques of using the scores to determine if a language should be selected are possible.

In some implementations, the determination of whether a given query should be translated into a current language is made in advance and stored, for example on one or more machine readable storage devices. In some implementations, the determination is stored in a relational database that associates a given query and a current language with the determination.

In step 440, a second language is selected (e.g., by a search engine provider). In various implementations, the current language is selected if it was determined in step 420 that the current language should be selected. If it was determined in step 420 that the current language should not be selected, then a language is selected according to a criterion.

A criterion specifies which language to select. For example, the criterion can specify one or more attributes the selected language should have, or can specify a method or algorithm for selecting the selected language. In various implementations, the criterion includes repeating the determining step 430 for one or more languages in a plurality of languages until it is determined that a language should be selected, and then selecting the language that it was determined should be selected. If it is determined that no language in the plurality of languages should be selected, then the second language is determined according to another criterion.

In some implementations, the plurality of languages has an order, and each language is considered in accordance with the order. In some implementations, the order is descending size of the corpus associated with each language. For example, if the plurality of languages is English, Dutch, and Cornish, and English has a larger associated corpus than Dutch and Dutch has a larger associated corpus than Cornish, then English would be considered first, then Dutch, and then Cornish. Considering languages in order of decreasing corpus size may have several advantages including, for example, ensuring selection of a relevant language with the largest corpus size of all of the relevant languages and thus increasing the total number of documents, visual media, and other information over which a search is performed.

Various other criterion are possible. For example, in some implementations, the criterion is selecting the language with the largest associated corpus. In some implementations, the criterion is selecting the language with the smallest associated corpus. In some implementations, the criterion is selecting a language by default, for example, English or Chinese.

In some implementations, the selected language corresponding to a given query is selected in advance and stored, for example on one or more machine readable storage devices. In some implementations, the selected language is stored in a relational database that associates a given query and its selected language.

In some implementations, the determining step 420 and the selecting step 430 are repeated to select additional different languages. In these implementations, the determination and selection are done as discussed above.

In step 450, a group of visual media search results is generated, based on the first visual media search query and a translation of the first visual media search query into the selected language (e.g., by a search engine provider).

In various implementations, the search results are generated as discussed above in regard to FIG. 3, where a quality of results statistic for the translated query is obtained, additional information corresponding to the quality of results statistic is optionally determined, and the visual media search query, its translation, and either the quality of results statistic for the translation or additional information about the quality of results statistic for the translation are used to generate the group of search results. In some implementations, the visual media search query and its translation are combined into one search query taking into account the quality of results statistic for the translation or additional information about the quality of results statistic for the translation. This search query is then used to generate a group of search results as discussed above in regard to FIG. 3. In some implementations, a group of search results responsive to the visual media search query is generated, a group of search results responsive to the translation of the visual media search query is generated, and the two groups of results are combined in an order based in part on the quality of results statistic for the translation as discussed above in regard to FIG. 3.

In various implementations, the quality of results statistic for the visual media search query is the click through rate: the number of times users selected a search result after submitting a query similar to the translated query divided by the total number of times a query similar to the translated query was submitted by the population of users. The click through rate can be limited to a click through rate for a particular population of users, for example, users who submit queries from a location where the language of the translated query is frequently used. Using a language can include, for example, speaking the language or submitting queries in the language. A location of a user submitting a search query can be determined, for example, by examining country specific domains or user-specified preferences. A country specific domain is specified by characters at the end of a web address used by the user to access the search system. For example, a web address ending in ".uk" corresponds to a United Kingdom specific domain. A web address ending in ".bg" corresponds to a Bulgarian specific domain. A web address is a string of characters used to identify a web page. User-specified preferences are, for example, a setting specified by a user which identifies the user's country. For example, a user searching from Spain might specify his country as Spain. Additional techniques for determining the location of a user can also be used, for example, examining the IP address corresponding to a computer from which the user submitted the query. An IP address is a logical address identifying a computer on a network. The IP address can be used to determine the user's location by, for example, looking the IP address up in a database that associates IP addresses with a service provider and identifying the location of the service provider. Other geolocation techniques using IP addresses are possible. The click through rate can also be limited to a particular time period, for example, the click through rate for queries received over the last six months, or the click through rate for queries received from Jan. 1, 2005 to Mar. 23, 2007.

In some implementations, the click through rate is calculated by examining user search history information stored, for example, as a user search history. A user search history stores a sequence of search queries submitted by a user. A user search history can also store information regarding how many or which results responsive to a search query were selected by a user and how long each selected search result was viewed. User search histories may also store additional information, such as the IP address of the user. User search histories can be created based on information sent from a user's computer to a search engine. User search histories can be generated by whoever is calculating the click through rate (e.g., a search engine provider) or can be generated by a third party and provided to whoever is calculating the click through rate. User search histories are a convenient way of storing user search history information, but other ways of formatting and storing the information can also be used.

In some implementations, the click through rate is calculated in real-time as queries are received from users and users select results. In these implementations, queries received from a user, and results selected by the user, are monitored and a click through rate is calculated immediately. In some implementations, calculating the click through rate in real time includes starting with an initial click through rate and updating it as user queries and selections are received.

In some implementations, the click through rates are pre-calculated and stored for later use, for example, in a relational database that associates a given query with its click through rate. In some implementations, the click through rates are calculated as they are needed to determine the quality of results statistic for of the translated query. In some implementations, the click through rates calculated as they are needed are stored for later use much as a click through rate calculated in advance is stored for later use.

In implementations where click through rates are stored for later use, the click through rates are stored, for example on one or more machine readable storage devices. The click through rates do not have to be in a contiguous section on a machine readable storage device, nor do the click through rates have to be completely stored on the same machine readable storage device. In some implementations, the click through rates are stored in a relational database that associates a given query with its click through rate.

Alternative quality of results statistics are possible, for example, quality of results statistics based on the dwell time of results responsive to a sufficiently similar query or quality of results statistics based on the popularity of the query.

Figure 5:
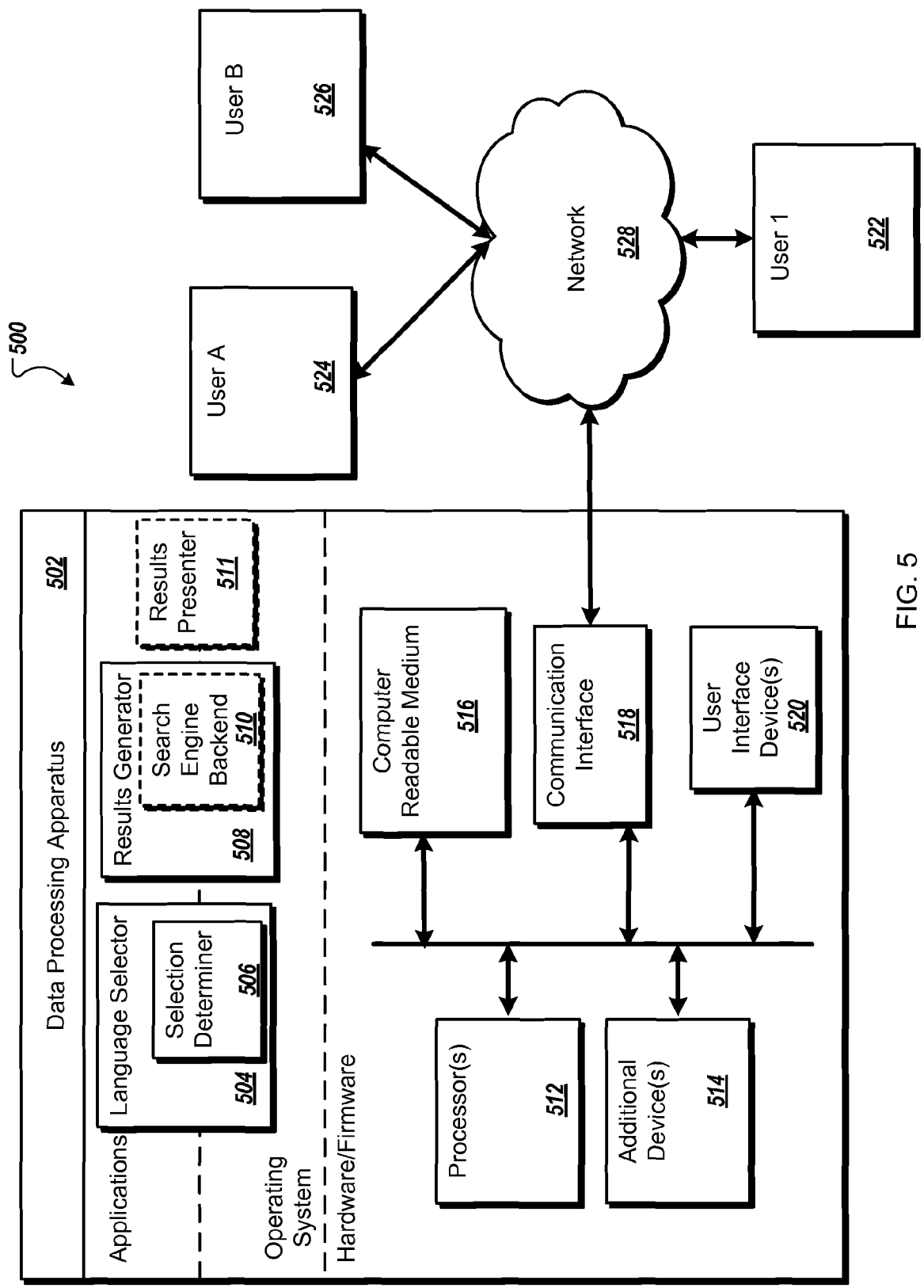
FIG. 5 illustrates an example architecture of a system.

FIG. 5 illustrates an example architecture of a system 500. The system generally consists of a server 502, one or more client computers 524 and 526 that send search queries and information regarding search results selected by the user to the server 502, and a client computer 522 used to submit a visual media search query to the server 502 and to receive visual media search results from the server 502. The computers are connected through a network 528.

While client computers 522, 524, and 526 are shown as separate computers, in some implementations they are the same computer. For example, a computer can be used to send search queries that are used to determine the quality of results statistic for a translated query and also be used to submit a visual media search query that will be augmented with its translation into one or more languages.

The server 502 is a data processing apparatus. While only one data processing apparatus is shown in FIG. 5, a plurality of data processing apparatus may be used.

In various implementations, the server 502 runs a number of processes, e.g. executable software programs. In various implementations, these processes include a language selector process 504, including a selection determiner process 506, and a results generator process 508 with an optional search engine backend 510. In some implementations the language selector process 504 and the selection determiner process 506 are separate processes. Running a process includes, for example, calling a copy of the process, providing system resources to the process, and communicating with the process through a hardware or software interface. A hardware or software interface is an interface that allows processes to communicate with each other or with system hardware, for example, a system bus or commands specified in an application programming interface. In some implementations, calling a copy of the process can include instantiating a copy of the process.

The language selector process 504 selects a language to translate a query into. In various implementations, this includes sending a visual media search query and a current language to the selection determiner process 506, receiving output from the selection determiner process 506 indicating whether the current language should be selected, selecting the language if the selection determiner process indicates that it should be selected, and otherwise selecting the language according to a different criterion. In some implementations, if the selection determiner process 506 indicates that a language should not be selected, the language selector process 504 continues to send the selection determiner process 506 languages from a plurality of languages until the selection determiner process 506 sends output to the language selector process 504 indicating that a language should be selected or until all languages in the plurality of languages have been considered. In some implementations, if the selection determiner process 506 does not indicate that a language should be selected, the language selector process 504 applies a different criterion such as selecting the language with the largest associated corpus, selecting the language with the smallest associated corpus, or selecting a language by default, for example, English or Chinese. In some implementations, the language selector process selects more than one language into which to translate the visual media search query.

The selection determiner process 504 determines whether a language should be selected. In some implementations, the selection determiner process 504 is part of the language selector process 504. In some implementations, the selection determiner process 504 is a free-standing process that communicates with the language selector process, for example, through a hardware or software interface. The selection determiner process 504 receives a visual media search query and a current language from the language selector. The selection determiner process then determines whether the current language should be selected by translating the visual media search query into one or more terms in the current language, calculating one or more scores for the one or more terms, and using the scores to determine whether to select the language. For example, the selection determiner process 504 can determine a language should be selected because the highest score is in an acceptable range. Other methods of using the scores to determine whether a language should be selected are possible. Once the selection determiner process 504 decides whether or not a language should be selected, data indicating its conclusion is sent to the language selector process 504.

The results generator process 508 generates a group of search results responsive to a visual media search query and a translation of the visual media search query into the language or languages selected by the language selector process 504. The language selector process sends information regarding the language it selected to the results generator process 508, for example, through a hardware or software interface. Information regarding the selected language can include, for example, the language itself or the translation of the visual media search query into the selected language. In various implementations, generating a group of search results includes determining a quality of results statistic for the visual media search query. In some implementations, the results generator 508 calculates the quality of results statistic for the visual media search query by calculating the click through rate of the query. Other methods of calculating a quality of results statistic for the visual media search query are possible. In some implementations, the quality of results statistic for the translation of the visual media search query is determined in advance and stored, for example, on the computer readable medium 516 of the server 502 or an external device 514 of the server 502, for example, a hard drive. In some implementations, the quality of results statistic for the translation of the visual media search query is provided by another process, for example through a hardware or software interface, or by another computer, for example through the network 528.

In some implementations, the results generator 508 combines the visual media search query and its translation into one query with information on how to rank the search results in accordance with the quality of results statistic for the translation of the visual media search query. The combined query is then passed to a search engine backend process 510. In alternative implementations, the query and its translation are provided separately to a search engine backend process 510 resulting in two separate groups of search results, and the results generator process combines the resulting two groups of search results into one group of search results.

The search engine backend process 510 performs a search corresponding to a query over one or more corpora of documents and returns a group of search results. In various implementations, the search engine backend 510 is run on the server 502. In these implementations, the search engine backend 510 and the results generator process 508 communicate, for example, through a hardware or software interface. In some implementations, the search engine backend 510 and the results generator 508 are part of the same process. In some implementations, the search engine backend is run on another computer and queries and search results are sent, for example, over a network.

In some implementations, the server 502 also runs a results presenter process 511 that presents search results. In some implementations, the results presenter process is part of the results generator process 508. Presenting search results can include, for example, displaying search results on a display device, transmitting search results to a user's computer 522 for presentation to the user, transmitting search results to another device, transmitting sounds corresponding to the search results, providing haptic feedback corresponding to the search results, or transmitting signals comprising haptic feedback corresponding to the search results to a user's computer 522 for presentation to the user. Other methods of presenting search results are possible.

In some implementations, the server 502 stores a quality of results statistic corresponding to a translation of one or more visual media search queries. In some implementations, the quality of results statistics are stored on a computer readable medium 516. In some implementations, the quality of results statistics are stored on one or more additional devices 514, for example, a hard drive. In some implementations, a representation of the quality of results statistics is stored instead of or in addition to the quality of results statistics themselves. In some implementations, a database is stored. The database associates a given translation of a query with its corresponding quality of results statistic, allowing the server to quickly access quality of results statistics associated with a query in the database.

In some implementations, the server 502 stores data associating one or more visual media search queries and one or more languages with the determination as to whether a given visual media search query should be translated into a given language. In some implementations, the data is stored on a computer readable medium 516. In some implementations, the data is stored on one or more additional devices 514, for example, a hard drive. In some implementations, a database is stored. The database associates a given visual media search query and a given language with the determination of whether the visual media search query should be translated into the language, allowing the server to quickly access a determination corresponding to a given visual media search query and a given language.

In some implementations, the server 502 stores data associating one or more visual media search queries with their selected languages. In some implementations, the data is stored on a computer readable medium 516. In some implementations, the data is stored on one or more additional devices 514, for example, a hard drive. In some implementations, a database is stored. The database associates a given visual media search query with its selected language for translation, allowing the server to quickly access a selected language associated with a given visual media search query in the database.

The server 502 also has hardware or firmware devices including one or more processors 512, one or more additional devices 514, computer readable medium 516, and one or more user interface devices 520. User interface devices 520 include, for example, a display, a camera, a speaker, a microphone, or a haptic feedback device.

The server 502 uses its communication interface 518 to communicate with a plurality of client computers 522, 524, and 526 through a network 528.

A plurality of client computers 524 and 526 are connected to the server 502 through the network 528. These client computers 524 and 526 are data processing apparatus. Users use these client computers 524 and 526 to submit search queries through the network to the server 502, for example, through a web-browser run on the client computer, for example, Firefox™, available from the Mozilla Project in Mountain View, Calif. The submitted search queries can be any type of search query, including visual media search queries and document search queries. Users submit queries to the server 502 during a session. In some implementations, users receive search results from the server 502 on their respective computers 524 and 526. In these implementations, when a user uses their computer to select a search results to view, information regarding the user selection is sent to the server 502 from the user's computer 524 or 526 through the network 528. In some implementations the information regarding the user selection also includes how long the user views the selection. In some implementations, a user search history is created. The user search history stores the sequence of queries submitted by the user and which results were selected after a search was submitted. The user search history may also include additional information such as how long each selected result was viewed. In some implementations, the user search history is stored on the client computer 524 or 526 (whichever one was used to submit the queries), for example on a computer readable medium or an external device such as a hard drive. In these implementations, the results generator process 508 can access the user search histories through the network 528 to determine a quality of results statistic for a translated query. In alternative implementations, the user search history is stored on the server 502 while or after search queries are received from a user.

User 1 runs a client computer 522 that is a data processing apparatus. User 1 uses their computer 522 to submit a visual media search query through the network 528 to the server 502, for example, through a web-browser. User 1 also uses their computer to view search results responsive to the visual media search query he or she submitted. These search results are transmitted by the server 502 to the user's computer 522 through the network 528. The user's computer may present the search results to the user, for example, by displaying the results on a display device, transmitting sound corresponding to the results, or providing haptic feedback corresponding to the results.

While the system 500 of FIG. 5 envisions a user who submits a visual media search query through their computer, the visual media search query does not have to be received from a user or a user's computer, but can be received from any data processing apparatus, process, or person, for example a computer or a process run on a computer, with or without direct user input. Similarly, the results do not have to be presented to the user's computer but can be presented to the data processing apparatus, process, or person that sent the visual media search query to the server or a different data processing apparatus, process, or person. While the system 500 of FIG. 5 envisions receiving a server 502 receiving a series of search queries and results selections from a plurality of users user A 524 and user B 526, the search queries and results selections do not have to be received directly from users but can be received, for example, from another computer that aggregates user search history information. In some implementations, the server 502 does not receive a series of search queries and results selections. In these implementations, the server receives quality of results statistics corresponding to given queries from one or more data processing apparatus, for example, through the network 528.

Figure 6:
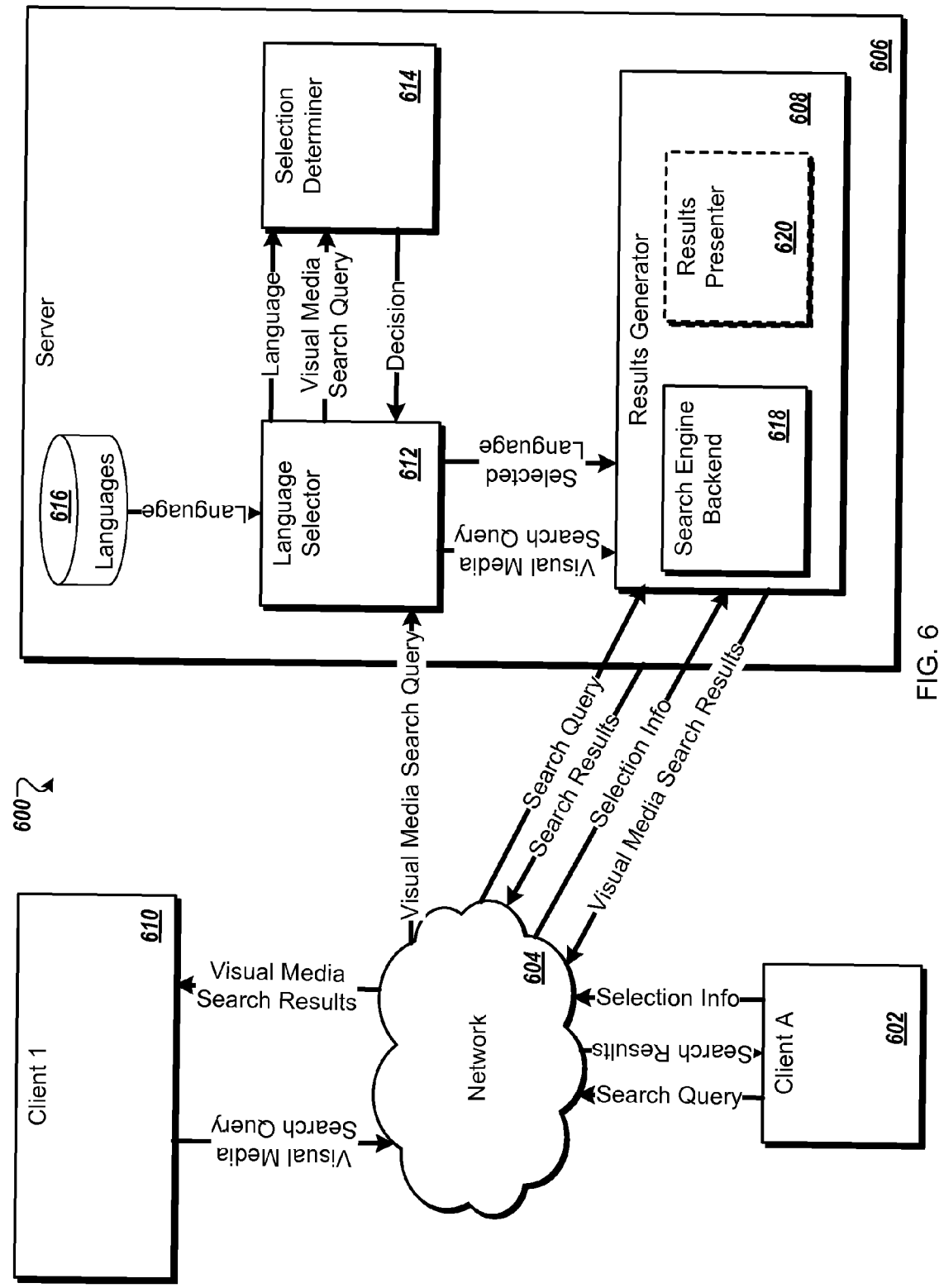
FIG. 6 illustrates example information flow through a system.

FIG. 6 illustrates example information flow through a system.

As shown in FIG. 6, a client computer, client A 602, sends search queries and selection information through the network 604 to the server 606. The search query indicates a search that the user would like to have performed. In some implementations, in response to the search query, the server 606 sends search results responsive to the search query to client A 602, for example, generated using a search engine backend. The selection information indicates one or more search results selected by a user from the search results responsive to the user's query. The selection information may also include additional information, for example how long the user viewed the search result. While only one client computer is shown sending search queries and selection information, a plurality of computers corresponding to users may be used. In some implementations, the search results are not generated by the server 606, but are generated by another data processing apparatus.

In various implementations, the server 606 stores the search queries and selection information, for example, on a computer readable medium of the server. In some implementations, the search query and selection information are stored as a user search history. In some implementations, the search query and selection information are stored on the client computer. In these implementations, the server 606 requests the information from the client computer 602 when it is needed. In some implementations, the server 606 or its results generator process 608 periodically process the stored search query and selection information and generate a quality of results statistic for one or more queries submitted by the users. In some implementations, the server 606 or its results generator process 608 process search queries and selection information in real-time as they are received. In some implementations, the quality of results statistic is stored, for example, on a computer readable medium of the server. For example, the quality of results statistic can be stored in a relational database that associates a given query with its quality of results statistic. In some implementations, the quality of results statistic is calculated by another computer or process and provided to the server 606, for example through the network 604 or a hardware or software interface.

In various implementations, user 1 uses their computer 610 to send a visual media search query through the network 604 to the server 606. In alternative implementations, the visual media search query is received from a process running on a computer. In some implementations, the process is running on the server 606 and the visual media search query is received, for example, through a hardware or software interface. In alternative implementations, the process is running on another computer and the visual media search query is received, for example, through the network 604.

In various implementations, when the server 606 receives the visual media search query, it sends it to the language selector 612, for example, through a hardware or software interface. The language selector 612 passes a language and the visual media search query to the selection determiner 614. In some implementations, the language is one of a plurality of languages 616. The selection determiner 614 determines whether or not the language should be selected by translating the visual media search query into one or more terms in the language, calculating a score for one or more of the terms, and using the score to determine whether the language should be selected. The selection determiner 614 then sends its decision to the language selector 612, for example, through a hardware or software interface. In some implementations, the language selector and the selection determiner are part of the same process.

In various implementations, the determination of whether a given language should be selected for a given visual media search query can be made in advance using the process described above. The determination is stored on the server, for example, as a relational database stored on a computer readable medium that associates a given visual media search query with the language it should be translated into. In these implementations, when the selection determiner 614 is asked whether a given visual media search query should be translated into a given language, it uses the stored determination. In some implementations a determination has been made for only certain visual media search queries and certain languages. In these implementations, when a determination of whether a given visual media search query should be translated into a given language is requested, the selection determiner 614 first accesses the stored determinations to determine if a determination has already been made. If so, the prior determination is used. If not, the selection determiner 614 determines whether the language should be selected using the process described above.

In various implementations, the language selector 612 selects the language if the selection determiner 614 decided that it should be selected. If the selection determiner 614 decided that the language should not be selected, the language selector 612 selects a language according to a criterion. In some implementations, the criterion includes repeating the steps of passing a language and the visual media search query to the selection determiner 614 for one or more languages in the plurality of languages 616, until the selection determiner 614 decides that one of the language should be selected or until all languages in the plurality of languages 616 have been considered. The language selector 612 then selects the language that the selection determiner decided should be selected, or, if no language was determined to be selectable, selects a language according to another criterion. Other criterion can be used, for example, selecting the language with the largest associated corpus, selecting the language with the smallest associated corpus, or selecting a language by default, for example English or Chinese. In some implementations, the languages in the plurality of languages 616 are in an order, and the language selector 612 considers them in that order. In some implementations, the languages in the plurality of languages 616 are ordered based on descending corpus size, such that the language with the largest associated corpus size is considered first and the language with the smallest associated corpus size is considered last.

In some implementations, a language corresponding to a visual media search query can be determined in advance using the process described above. The languages corresponding to visual media search queries are stored on the server, for example, as a relational database stored on a computer readable medium that associates a given visual media search query with the language it should be translated into. In these implementations, when the language selector 612 is asked to select a language into which to translate a visual media search query, it accesses the stored language information and selects the language associated with the visual media search query. In some implementations, only certain visual media search queries have an associated language determined in advance, for example, visual media search queries corresponding to popular concepts in certain languages. In these implementations, when a visual media search query is submitted, the language selector 612 first checks to see if a language has already been selected for the visual media search query, selects a language if the language has already been selected for the visual media search query, and otherwise selects the language as discussed above.

In various implementations, once a language has been selected, the visual media search query and the selected language are sent to the results generator 608. In some implementations, the translation of the visual media search query into the selected language is sent instead of or in addition to the selected language. If a quality of results statistic for the visual media search query translated into the selected language has not already been determined, the results generator 608 determines a quality of results statistic using, for example, the search queries and selection information from users to calculate a click through rate for the translated query. The results generate may optionally determine information about the quality of results statistic. If a quality of results statistic for the visual media search query translated into the second language, or information about the quality of results statistic, has been determined, the results generator retrieves it from where it is stored on the server 606.

In various implementations, the results generator generates a group of search results by combining the search query and the translated search query into one query, taking into account the quality of results statistic for the translated query, and using a search engine backend 618 to run a search corresponding to the combined query. The search engine ranks the search results based in part on the quality of results statistic for the translated query. For example, if each search result has a corresponding score, the search engine backend can adjust the scores using the quality of results statistic, and rank the search results in order of their scores. In some implementations, the search engine backend 618 is run on the server 606, and the combined query is sent to the search engine backend, for example, through a hardware or software interface. The search engine backend 618 then sends search results responsive to the combined query to the results generator 608, for example, through a hardware or software interface. In alternative implementations, the search engine backend 618 is run on a separate data processing apparatus and the search query and resulting search results are sent, for example, through the network 604. In some implementations, the results generator generates a group of search results by sending two queries to the search engine backend 618, one responsive to the search query and one responsive to the translated search query, receiving two groups of results from the search engine backend 618, and combining the results based in part on a quality of results statistic for the translated query. For example, the results generator 608 could examine scores associated with each of the results provided by the search engine backend 618 and adjust the scores based on the quality of results statistic for the translated query. The results generator 608 could then combine the search results in an order based on their score. Other techniques for combining search results are possible.

In various implementations, once the results generator 608 has generated a group of visual media search results, the server 606 presents the search results by sending them through the network 604 to the device that submitted the search 610. In some implementations the server 606 can present the results in other ways, including, for example, sending the results to the process that sent the visual media search query, sending the search results to another data processing apparatus or process, displaying search results on a display device, transmitting sounds, or providing haptic feedback. In some implementations, the search results are presented by a results presenter 620 run on the server 606. In some implementations, the results presenter 620 is part of the results generator 608.

Figure 7:
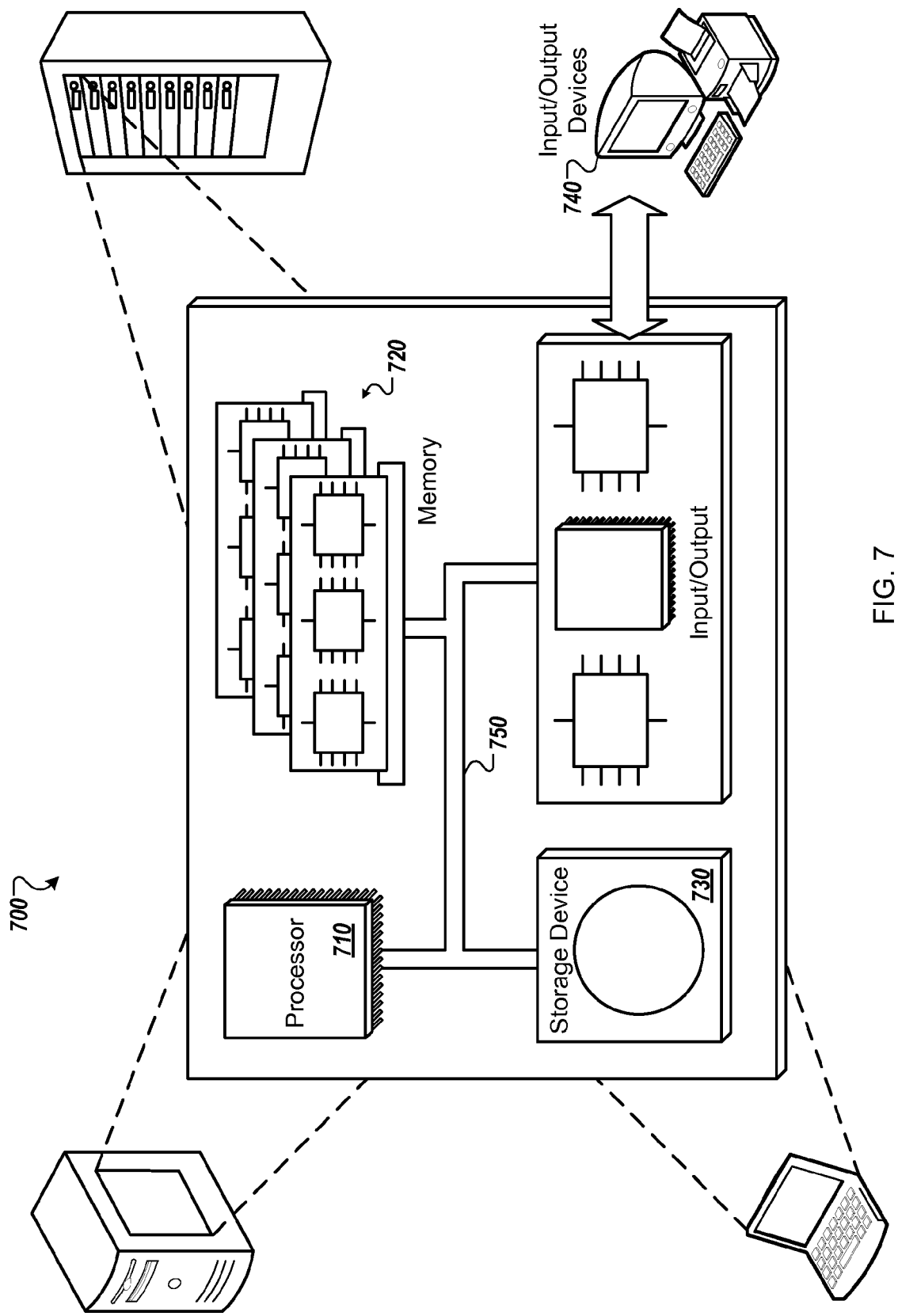
FIG. 7 is a schematic diagram of a generic computer system.

FIG. 7 is a schematic diagram of an example of a generic computer system 700. The system 700 can be used for the operations described in association with the method 400 according to one implementation. For example, the system 700 may be included in either or all of the client computer of user A, 524, the client computer of user B, 526, the client computer of user 1, 522, and the server 502.

The system 700 includes a processor 710, a memory 720, a storage device 730, and an input/output device 740. Each of the components 710, 720, 730, and 740 are interconnected using a system bus 750. Instructions that implement operations associated with the methods described above can be stored in the memory 720 or on the storage device 730. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700, including program instructions. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device. The storage device can store extractors, pattern matching engines, gadgets, machines, and programs.

The input/output device 740 provides input/output operations for the system 700. In one implementation, the input/output device 740 includes a keyboard and/or pointing device. In another implementation, the input/output device 740 includes a display unit for displaying graphical user interfaces.

The features described above can be implemented in digital electronic circuitry, integrated circuitry, specially designed ASICs (application specific integrated circuits), computer hardware, firmware, software, and/or combinations thereof. Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used in this specification, the terms "machine-readable medium" or "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data, including databases, include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, client computer of user 1, 522 and the server, 502, may be implemented within the same computer system.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of embodiments of the invention have been described. Nevertheless, it will be understood that various modifications may be made without departing from the spirit and scope of the invention. Accordingly, other embodiments are within the scope of the following claims.

What is claimed is:

1. A computer implemented method, comprising:
  receiving a first search query comprising at least one original term in a first language;
  for each of one or more different languages, each different language being associated with a different collection of documents, (i) translating one or more of the original terms of the first search query into one or more translated terms in the respective language and (ii) determining, for each translated term, a score that is a measure of how common the translated term is in the collection of documents associated with the respective language;
  in response to determining that at least one of the one or more determined scores for the translated terms into a second language is: (i) greater than a first threshold: and (ii) less than a second threshold, selecting the second language from the one or more different languages;
  generating a second query, the second query being a translation of the first search query into the second language;
  generating a combined search query using: (i) the first search query comprising at least one original term in the first language, and (ii) the second query in the second language; and
  obtaining a final group of search results responsive to the combined search query, wherein the final group of search results comprise search results satisfying the first search query and search results satisfying the second query, wherein each of the search results in the final group of search results is assigned a score based in part on a quality of results statistic for the second query.

2. The method of claim 1 wherein the plurality of different languages have an order and each language is considered in accordance with the order.

3. The method of claim 2 wherein the order is descending size of the respective collection of documents associated with each language.

4. The method of claim 1, further comprising receiving the first search query from a client computer and providing the final group of search results to the client computer.

5. The method of claim 1 wherein the score is an inverse document frequency of the translated term in the respective collection of documents associated with the language.

6. The method of claim 1, further comprising:
  selecting a third language from the plurality of different languages based at least in part on one or more of the determined scores for the third language;
  wherein obtaining the final group of search results is further based on a third query, the third query being a translation of the first search query into the third language, and wherein the one or more of the final group of search results are assigned the ranking based in part on a quality of results statistic for the third query.

7. The method of claim 1, wherein a search result of the final group of search results is an image, a video, an image embedded in a file, or a video embedded in file.

8. A computer program product, encoded on a non-transitory computer readable medium, operable to cause data processing apparatus to perform operations comprising:
  receiving a first search query comprising at least one original term in a first language;
  for each of one or more different languages, each different language being associated with a different collection of documents, (i) translating one or more of the original terms of the first search query into one or more translated terms in the respective language and (ii) determining, for each translated term, a score that is a measure of how common the translated term is in the collection of documents associated with the respective language;
  in response to determining that at least one of the one or more determined scores for the translated terms into a second language is: (i) greater than a first threshold: and (ii) less than a second threshold selecting the second language from the one or more different languages;
  generating a second query, the second query being a translation of the first search query into the second language;
  generating a combined search query using: (i) the first search query comprising at least one original term in the first language, and (ii) the second query in the second language; and
  obtaining a final group of search results responsive to the combined search query, wherein the final group of search results comprise search results satisfying the first search query and search results satisfying the second query, wherein each of the search results in the final group of search results is assigned a score based in part on a quality of results statistics for the second query.

9. The computer program product of claim 8, wherein the plurality of different languages have an order and each language is considered in accordance with the order.

10. The computer program product of claim 9 wherein the order is descending size of the respective collection of documents associated with each language.

11. The computer program product of claim 8, further operable to cause the data processing apparatus to perform operations comprising receiving the first-search query from a client computer and providing the final group of search results to the client computer.

12. The computer program product of claim 8 wherein the score is an inverse document frequency of the translated term in the respective collection of documents associated with the language.

13. The computer program product of claim 8, further operable to cause the data processing apparatus to perform operations comprising:
    selecting a third language from the plurality of different languages based at least in part on one or more of the determined scores for the third language;
    wherein obtaining the final group of search results is further based on a third query, the third query being a translation of the first search query into the third language, and wherein the one or more of the final group of search results are assigned the ranking based in part on a quality of results statistic for the third query.

14. The computer program product of claim 8, wherein a search result of the final group of search results is an image, a video, an image embedded in a file, or a video embedded in file.

15. A system comprising one or more computers operable to perform operations comprising:
    receiving a first search query comprising at least one original term in a first language;
    for each of one or more different languages, each different language being associated with a different collection of documents, (i) translating one or more of the original terms of the first search query into one or more translated terms in the respective language and (ii), determining for each translated term, a score that is a measure of how common the translated term is in the collection of documents associated with the respective language;
    in response to determining that at least one of the one or more determined scores for the translated terms into the second language is (i) greater than a first threshold: and (ii) less than a second threshold, selecting the second language from the one or more different languages;
    generating a second query, the second query being a translation of the first search query into the second language;
    generating a combined search query using: (i) the first search query comprising at least one original term in the first language, and (ii) the second query in the second language; and
    obtaining a final group of search results responsive to the combined search query, wherein the final group of search results comprise search results satisfying the first search query and search results satisfying the second query, wherein each of the search results in the final group of search results is assigned a score based in part on a quality of results statistic for the second query.

16. The system of claim 15, wherein the plurality of different languages have an order and each language is considered in accordance with the order.

17. The system of claim 16 wherein the order is descending size of the responsive collection of documents associated with each language.

18. The system of claim 15, further operable to perform operations comprising receiving the first search query from a client computer and providing the final group of search results to the client computer.

19. The system of claim 15 wherein the score is an inverse document frequency of the translated term in the respective collection of documents associated with the language.

20. The system of claim 15, further operable to perform operations comprising:
    selecting a third language from the plurality of different languages based at least in part on one or more of the determined scores for the third language;
    wherein obtaining the final group of search results is further based on a third query, the third query being a translation of the first search query into the third language, and wherein one or more of the final group of visual media search results are assigned the ranking based in part on a quality of results statistic for the third query.

21. The system of claim 15, wherein a search result of the final group of search results is an image, a video, an image embedded in a file, or a video embedded in file.

\* \* \* \* \*

UNITED STATES PATENT AND TRADEMARK OFFICE
CERTIFICATE OF CORRECTION

PATENT NO.         : 8,577,910 B1                                   Page 1 of 1
APPLICATION NO.    : 12/481454
DATED              : November 5, 2013
INVENTOR(S)        : Vanessa Hodge et al.

It is certified that error appears in the above-identified patent and that said Letters Patent is hereby corrected as shown below:

In the Claims:

Column 21, Line 63, Claim 1, please delete "threshold:" and insert therefor -- threshold; --;

Column 22, line 52, Claim 8, please delete "threshold:" and insert therefor -- threshold; --;

Column 22, line 53, Claim 8, please delete "threshold" and insert therefor -- threshold, --;

Column 22, line 67, Claim 8, please delete "statistics" and insert therefor -- statistic --;

Column 23, line 45, Claim 15, after "into" please delete "the" and insert therefor -- a --;

Column 24, line 1, Claim 15, please delete "is" and insert therefor -- is: --; and Column 24, line 1, Claim 15, please delete "threshold:" and insert therefor -- threshold; --.

Signed and Sealed this
Twenty-seventh Day of May, 2014

Michelle K. Lee
*Deputy Director of the United States Patent and Trademark Office*